Sept. 29, 1953  O. A. BARTHOLOMEW  2,654,021
FLUORESCENT LAMP ASSEMBLY
Filed April 17, 1950  2 Sheets-Sheet 1
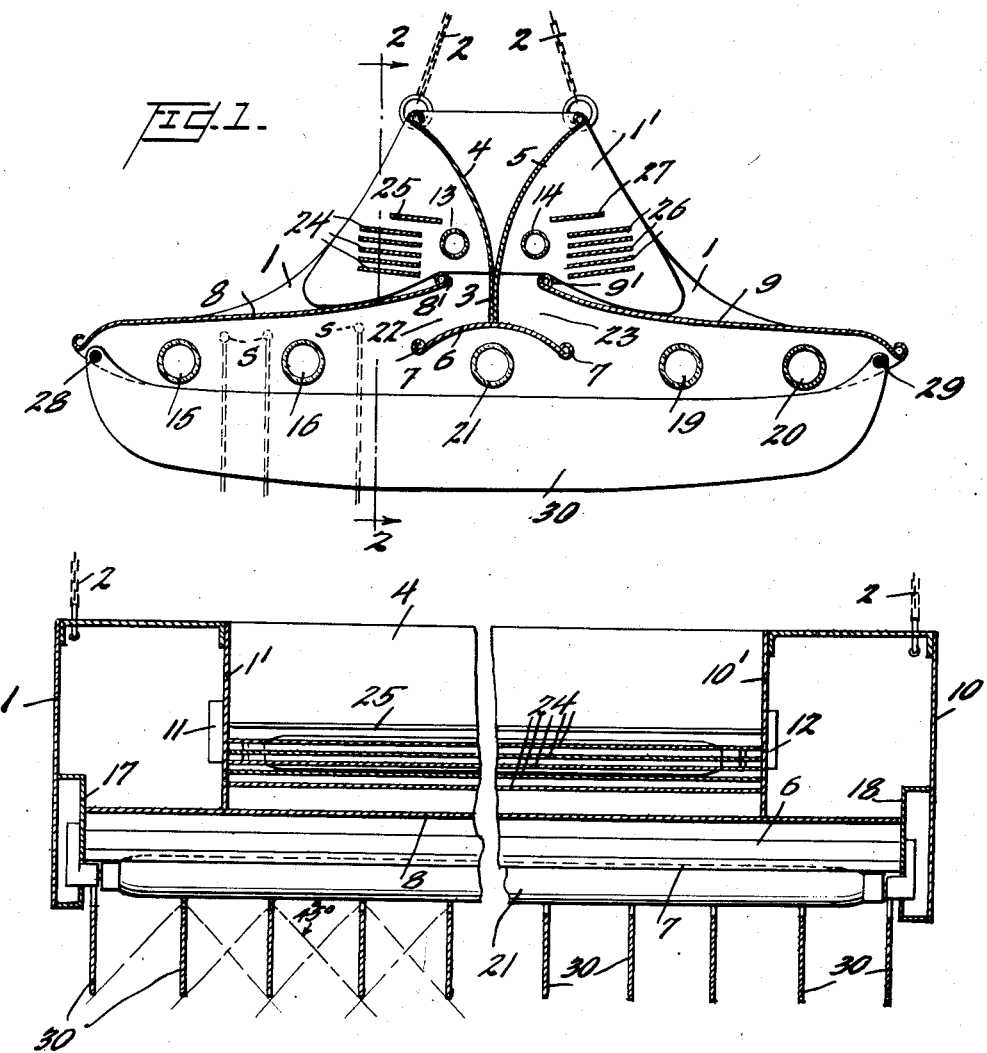
INVENTOR
Orlo A. Bartholomew
BY Parker Cook
ATTORNEY

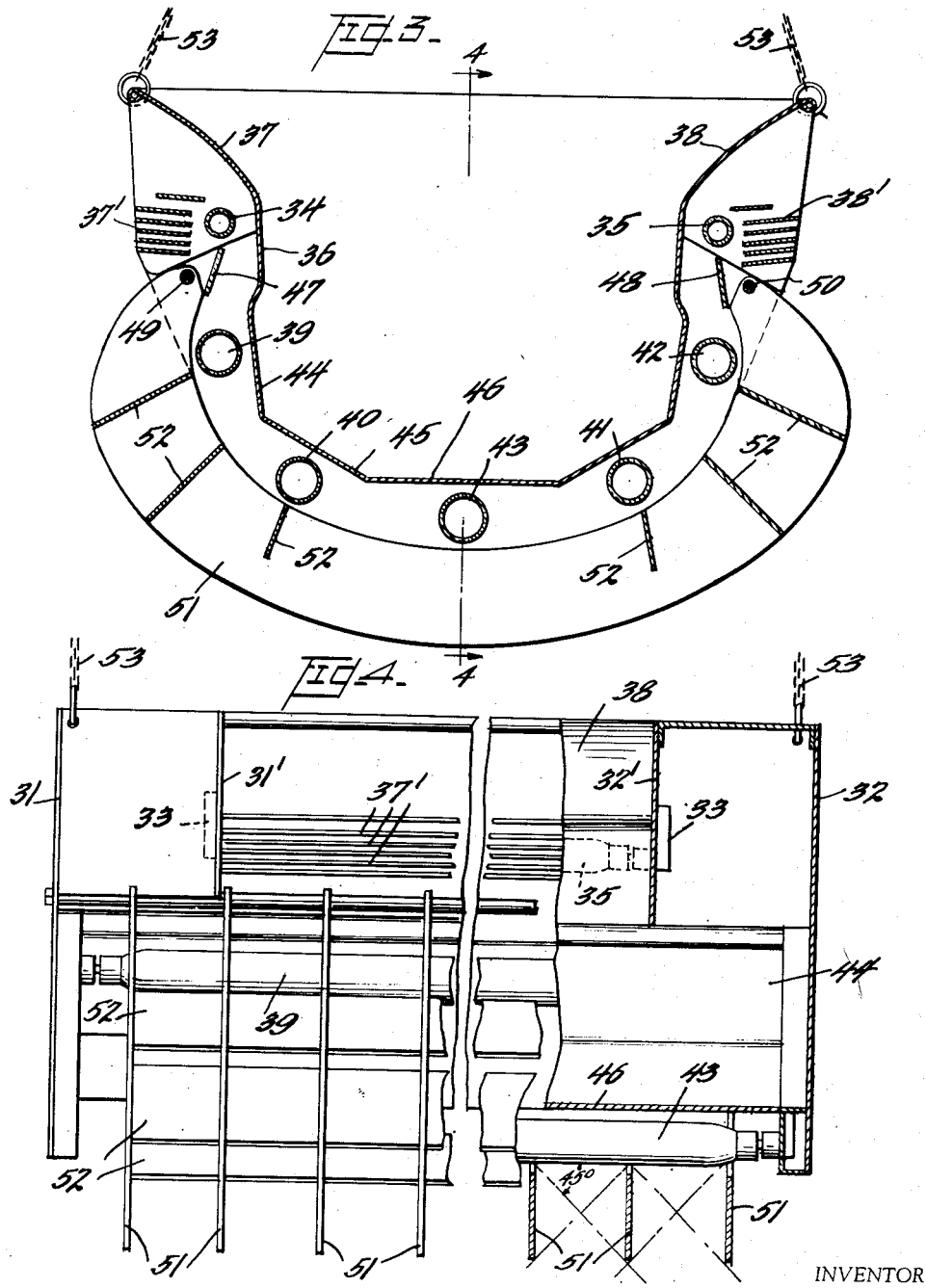

Patented Sept. 29, 1953

2,654,021

UNITED STATES PATENT OFFICE 2,654,021

FLUORESCENT LAMP ASSEMBLY

Orlo A. Bartholomew, Atlantic City, N. J.

Application April 17, 1950, Serial No. 156,287

5 Claims. (Cl. 240—51.11)

My invention relates to new and useful improvements in a fluorescent lamp assembly and has for an object to provide an assembly that combines the advantages of germicidal lamps, fluorescent illuminating lamps and a fluorescent ultra-violet sun lamp. Thus, in the one fixture or assembly there are provided germ-killing lamps; lamps for producing the desired illuminating effect; and an ultra-violet sun lamp for its therapeutic value.

Another object of the invention is to provide an assembly wherein any or all of the three types of lamps may be lighted, it being far more preferable, however, to light the fluorescent illuminating lamps when the germicidal lamps are lighted, so that the heat from the fluorescent illuminating lights will travel upwardly and around the germicidal lamps to thus subject more of the germ-laden air to the rays of the germicidal lamps and also cause a draft through the assembly, so that the air in the room will also be circulated and brought into the zone of the germ-killing rays of the germicidal lamps.

Still another object of the invention is to so form the assembly that it will preferably have two germicidal fluorescent lamps, while directly beneath the same is the ultra-violet fluorescent sun lamp, but so arranged that any heat from this lamp will also pass upwardly and circulate about the germicidal lamps, while the fluorescent illuminating lamps will be arranged on the opposite halves of the fixture, so that the heat from these illuminating lamps and the ultra-violet sun lamp will all pass upwardly and circulate about the said germicidal lamps.

Still another object of the invention is to provide an assembly wherein certain baffles are arranged below the fluorescent illuminating lamps and the fluorescent ultra-violet sun lamp so that when viewed, say, from the floor, and looking along the longitudinal axis of the fixture or assembly, unless the viewer is viewing the ultra-violet sun lamp from nearly under the same, he can not perceive the direct rays from the fluorescent sun lamp or the fluorescent lighting lamps.

Furthermore, the fluorescent germicidal lamps are so arranged that a viewer or person on the floor would never be subjected to the rays of the germicidal lamps, as to view these, it would be necessary to be on the same horizontal plane as the fixture. The reason for this is that germicidal lamps will have a serious effect on the eyes and skin.

Still another object of the invention is to provide an assembly wherein not only do the several lamps perform their own functions, but they also combine to provide the desired flow of air around the germicidal lamps for the purposes heretofore mentioned.

Still another object of the invention is to provide an assembly or fixture to accommodate these several types of lamps, and wherein certain brackets are formed to readily support the germicidal lamps as these are shorter in length than the conventional fluorescent illuminating lamps and the fluorescent ultra-violet sun lamps.

Still another object of the invention is to provide an assembly or fixture that is relatively light in weight and will provide a maximum ultra-violet outlet and a maximal travel of energy to the air containing bacteria; and wherein the value of the ultra-violet sun lamp as well as the germicidal lamps may be obtained, plus the desired illuminating effect from the conventional fluorescent lamps.

With these and other objects in view, the invention consists in certain new and novel features and combination of parts as will be hereinafter more fully described and pointed out in the claims.

Referring to the drawings, showing a preferred form and one modification,

Fig. 1 is a sectional view of the fluorescent lamp installation,

Fig. 2 is a sectional view taken on line 2—2 of Fig. 1,

Fig. 3 is a view similar to Fig. 1, showing the modified form of assembly, and

Fig. 4 is a view partly in side elevation and partly in section, as taken on line 4—4 of Fig. 3.

At the outset, it will be understood that hereafter wherever the word "lamp" is used, it refers to a fluorescent tube; and that although the wiring, starter and ballasting means are not shown, they, of course, will be included in the fixture.

Referring now to Figs. 1 and 2, showing the preferred form of installation, there will be seen the improved assembly, the fixture having the end-piece 1 to which are fastened the chains 2, which in turn support the fixture from the ceiling. There may also be seen a form of bifurcated reflector 3 with its one reflector arm 4 and the similar arm 5 but curved in the opposite direction.

These reflectors are preferably made from a high-polished, relatively thin aluminum sheet, which reflectors are known in the trade as "Alzac" reflectors, as their reflecting surface is substantially twice that of a chromium plated reflector, so that the efficiency of this form of reflector is far greater than its nearest substitute.

At the lower end of this bifurcated reflector 3 will be seen an arcuate "Alzac" reflector 6, whose side edges terminate as at 7. Spaced above this reflector 6 and extending from opposite sides from the end piece 1 and the end piece 10, later to be mentioned, may be seen the two "Alzac" reflectors 8 to the left and 9 to the right (Fig. 1), and their inner adjacent edges terminate respectively at the points 8' and 9'.

It will be noticed that there is a space between the upper surface of the reflector 6 and the reflectors 8 and 9; and it will also be seen that the inner edges of these reflectors 8 and 9 terminate at a spaced distance from the vertically extending lower part of the bifurcated reflector 3. Thus, there are air passages for the heated air that may flow from the under-surface of the reflectors 8 and 9 and also from under and above the arcuate reflector 6.

It will also be noticed that in this assembly the left half (Fig. 1) of the fixture is identical with the right half; and by having the bifurcated reflector 3, the heat will be evenly divided in passing up to the arm 5 and to the arm 4 of the bifurcated reflector 3 through the passages 22 and 23, to be mentioned.

Glancing at Fig. 2 for the moment, there will be seen in section the one end-piece 1 heretofore mentioned and the opposite end-piece 10; and it will be understood that the chains 2 are duplicated on this opposite end-piece 10.

It will also be noticed that there are additional insert end-walls 1' and 10', in each of which will be mounted sockets 11 and sockets 12; and in these respective sockets 11 and 12 will be mounted the germicidal lamp 13 to the one side of the arm 4 and the similar germicidal lamp 14 on the other side of the arm 5 of the reflector 3.

As heretofore mentioned, I have not shown the necessary starters or ballasts, but it will be understood that these are included as in all fluorescent lamp fixtures.

It will be noticed that these end-walls 1' and 10' are spaced a substantial distance inwardly from the end-pieces 1 and 10, as these germicidal lamps are made up in certain stock sizes and are shorter than the ordinary fluorescent illuminating lamp and also the fluorescent ultra-violet sun lamp.

There are certain advantages about this in that it will never be possible for the person putting the lamps in the sockets, of getting the germicidal lamps in other than in their right sockets, and thus possibly subjecting the user to the rays that would affect the eyes.

Now, referring to the position of the fluorescent illuminating lamps and the sun lamp, glancing at Fig. 1, it will be seen that I provide two fluorescent illuminating lamps 15 and 16 which are mounted in sockets on the plates 17 and 18, which in turn are spaced slightly inwardly from the respective end-pieces 1 and 10. There will be the conventional sockets for these tubes, which sockets I have not illustrated in detail.

To the right of the fixture (Fig. 1) these illuminating lamps are duplicated, that is, there are two fluorescent lighting lamps 19 and 20. Directly under the "Alzac" reflector 6 may be seen the ultra-violet sun lamp 21.

Thus, in this one fixture, there are accommodated five lamps in the lower portion or body of the fixture, and two germicidal lamps 13 and 14 mounted in a plane above these lamps; and there are also the air passages 22 and 23 to permit heated air from the five lamps in the lower part of the fixture to pass up and about the germicidal lamps 13 and 14 heretofore mentioned.

These bifurcated arms 4 and 5 of the reflector 3 are curved, and should direct the rays in a focal plane about 10° above the horizontal; in other words, the light should not irradiate the ceiling, but only the space just below the same. In other words, germicidal fixtures are supposed to project enough ultra-violet rays as possible to a space just below the ceiling of minimum ultra-violet reflectivity to make that space in turn a source of germ-free air, and especially for the sanitary valuation of the lower part of the room.

Glancing at Fig. 1, there will be noticed in front of the germicidal lamp 13 a plurality of louvres 24, which extend throughout the length of the fixture, that is, between the inner-spaced end-walls 1' and 10'; and another louvre 25, which is set in slightly closer to the germicidal lamp 13; and these louvres are placed parallel to the focal plane of the reflecting arm 4 to intercept a minimum of the reflected energy to thus shield the ceiling. The louvres also permit the heated air from the lower lamps to pass between these louvres and out through the germ-killing rays.

The number of louvres, of course, will depend on their width and their spacing position; and, as heretofore mentioned, should be parallel with the focal planes of the reflectors 4 and 5. Other louvres 26 and 27 are duplicated in front of the germicidal lamp 14, and, of course, will be in front of the arm 5 of the reflector 3.

Thus, it will be seen that very little of the rays from these tubes 13 and 14 will be thrown on the ceiling which, of course, as heretofore pointed out, is desirable.

Now, supported by the rods 28 and 29 that run from the one end of the fixture to the other end are a plurality of vertically extending baffles or shields 30, and the number, of course, will depend on the length of the fixture and the depth of these baffles 30.

Knowing these two variables the fixture has these baffles 30 so spaced that the direct rays projected cover a field of 90° from the horizontal between each baffle. Thus, if the lamp assembly is to be positioned, say in a school room, it should be positioned in front of the pupils, and with the longitudinal axis of the assembly extending in the same direction as the line of vision of the pupils, so that they can not look directly at the lamps but can get the advantages of the reflected rays.

It will be understood that the fixture can be placed directly over the head of the observer to get the benefits of the ultra-violet sun lamp, but then the observer should not glance at the fixture for such a length of time that the eyes might be affected.

It will be understood, as heretofore mentioned, that the direct rays from the germicidal lamps 13 and 14 can never be perceived from the floor as the rays are shielded or baffled from beneath; and it would be necessary for the observer to stand on nearly the same horizontal plane as the fixture for the rays from these lamps 13 and 14 to be thrown on to him.

In Fig. 1, there are shown the three switches S which will be of the pull-chain type so that they can be actuated from the floor; and it will be understood that one switch will control the four fluorescent illuminating lamps 15, 16, 19 and 20, these lamps being, of course, connected in parallel. Another switch will control the fluorescent ultra-violet sun lamp 21, and the remaining switch will control the two germicidal lamps 13 and 14, which, of course, will be connected in parallel.

As heretofore mentioned, the wiring is conventional; and I have not shown the ballasts and starters, but these will also be conventional, and form no part of the invention per se.

Thus, any of the three types of lamps may be lighted individually, and this is advisable as at times it is not desired to burn the sun lamp 21 for too great a length of time. On the other hand, the germicidal lamps 13 and 14 are generally kept burning when the illuminating lamps 15, 16, 19 and 20 are lighted; and the illuminating lamps should always be lighted when the germicidal lamps are burning, as, as heretofore mentioned, a flow of air about the germicidal lamps is always desirable.

It has been estimated that the use of the germicidal lamp for two minutes will kill more than ninety (90%) per cent. of the germs in the air within the room.

Having described the assembly and operation of the preferred form, reference is now made to the modified form shown in Figs. 3 and 4.

It will be understood at the outset that the same combination of lamps is used, that is, two germicidal lamps, one ultra-violet sun lamp, and four illuminating fluorescent lamps. Rather than having a bifurcated reflector about centrally of the fixture, as shown in the preferred form, I use an "Alzac" reflector that is substantially U-shaped in cross-section, having the upper ends curved to the desired degree, so that the focal plane will be about 10° above the horizontal; and then I mount the several type lamps around the perimeter, as will now be described in detail.

Referring now for the moment to Fig. 4, there will be seen the end-piece 31 to the left of the view and the end-piece 32 to the right of the view, and the inner plates 31' and 32', as it will be remembered that the germicidal lamps are shorter in length than the other types of lamps used; and there are sockets 33 secured in these respective inner end-pieces 31' and 32' to hold the respective germicidal lamps 34 and 35 (Fig. 3).

To the rear of these germicidal lamps 34 and 35 will be the heretofore mentioned "Alzac" substantially U-shaped reflector 36, which curves upwardly and outwardly as at 37; and, on the opposite side, as at 38. The curvature is similar to that in the preferred form in that the focal plane should be about 10° above the horizontal to permit a low rate of emissivity and preventing the ceiling from being discolored.

Also, around the perimeter of this "Alzac" substantially U-shaped reflector 36 may be seen the fluorescent illuminating lamps 39 and 40 to the left of the view, and 41 and 42 to the right of the view, and the ultra-violet sun lamp 43 at the bottom.

Although I have stated that the reflector 36 is of substantially U-shape, the reflector rather than being a continuous curve throughout its U-shape length, is arranged to provide angular portions as at 44, 45, 46, etc.

Looking at the upper portions 37 and 38 of the reflector 36, there will be noticed the louvres 37' and 38' which are arranged parallel with the focal plane which, it will be remembered, is 10° from the horizontal. Also, it will be noticed, just below the lamps 34 and 35 are the respective heat baffles 47 and 48 so that the heat in passing upwardly from the fluorescent illuminating lamps 39 and 42 and any from the ultra-violet sun lamp 43 will impinge against these respective baffles 47 and 48 and be directed around the respective lamps 34 and 35 rather than passing directly out through the aforementioned louvres 37' and 38'.

Looking at Fig. 3 for the moment, and to the left thereof, there will be seen the rod 49 and to the right of the view the similar rod 50; and these extend from the outer end-pieces 31 and 32, so that baffles 51, which are also arcuate in cross-section, may be hung thereon. It will be noticed that they substantially follow the contour of the lower portion of the U-shaped reflector 36. These baffles 51, of course, extend transversely of the longitudinal axis of the fixture, but I also provide the baffles 52 which run longitudinally of the entire fixture to thus provide what is known as egg-crate baffling to shield the direct rays, unless viewed from nearly directly under the fixture.

It will also be noticed that when the assembly is hung from the ceiling, none of the direct rays from the germicidal lamps 34 and 35 can be perceived, as an observer would have to be on substantially a horizontal plane to be subjected to these germ-killing rays.

It will thus be seen that this one U-shaped reflector 36 takes the place of the four reflectors in the preferred form, one of which latter is bifurcated to form the desired reflecting angle for the germicidal lamps.

It will also be noticed that the assembly is not as great in width as the one in the preferred form, as the fluorescent lamps are in four different horizontal planes, rather than all in two planes, as shown in the preferred form. The assembly may be supported by chains 53 to the ceiling; and it will be understood that the necessary starting units and ballasts will be mounted in the fixture as in the preferred form.

Furthermore, the electric wiring and switches (not shown) will be the same so that either the illuminating lamps 39, 40, 41, and 42 may be burned without lighting the sun lamp 43 or the germicidal lamps 34 and 35, and in the same manner these lamps may be lighted without burning the other.

However, as in the preferred form, it is always desirable to burn the illuminating lamps 39, 40, 41 and 42 when burning the germicidal lamps 34 and 35, so that the hot air will pass up around these lamps 34 and 35 to circulate the air and bring more of it in front of the germ-killing rays of these germicidal lamps 34 and 35.

It is also well known that twice as much light can be obtained from the fluorescent systems as from incandescent installation and at the same cost for the current. Furthermore, the high level lighting is provided by the fluorescent lamp with a minimum glare, and a minimum of lamp shielding, because its low surface brightness is distributed over a relatively large luminous area. Also, the fluorescent illuminating lamp emits a flow discharge from its entire surface, as distinguished from the point discharge of incandescent lamps. A fluorescent 40-watt tube, for example, has 225 square inches of luminous surface, compared with 20 square inches for an incandescent lamp of the same wattage.

From the foregoing, it will be seen that I have provided a fluorescent lamp assembly that combines the advantages of fluorescent illuminating lamps, fluorescent ultra-violet sun lamps, and fluorescent germicidal lamps; and wherein the heat from the illuminating lamps and the sun lamp is allowed to flow upwardly around the fluorescent germicidal lamps to therefore cause more air to pass through the rays of the germicidal lamps. Also, all of the lamps are baffled so that an observer, unless at a certain angle, will not be subjected to the direct rays of the illuminating lamps and sun lamp, and on the other hand will never be subjected to the direct rays from the germicidal lamps.

Furthermore, the fixture comprising a part of the assembly will accommodate the shorter germicidal lamps and the longer illuminating lamps and sun lamp.

Again, although the heat from the fluorescent illuminating lamps is only half as great as from an incandescent lamp, still the heat from these four illuminating lamps will provide enough heat to cause circulation of the air around these germicidal lamps and at half the cost of what any other form of lamp would be.

As mentioned in the earlier part of the specification, it is most desirable to have the reflectors, either shaped as in the preferred form or the modified form, made of highly polished aluminum which is known by the trade-name of "Alzac," as its efficiency is twice as great as that of any other reflecting material.

The fixtures housing these lamps are relatively light in weight, easily assembled after the parts are pre-formed, and the tubes may easily be removed and replaced when necessary.

I am aware that incandescent lamps have been used with germicidal lamps to cause heat to flow around the germicidal lamps, but here the illumination is only half what it would be from a comparable fluorescent lamp, and the cost is considerably more.

Furthermore, I am not aware of an assembly wherein the germicidal, illuminating and ultra-violet sun lamps have been so combined as to perform the desired functions as set forth above.

Finally, it will be understood that although I have illustrated both forms of assembly as being provided with a plurality of germicidal lamps and a plurality of illuminating lamps and a single sun lamp, with but few changes and without departing from the spirit and scope of the invention, only one germicidal lamp might be used and a lesser number of fluorescent illuminating lamps.

Other slight changes might be made without departing from the spirit and scope of the invention.

Having thus described my invention, what I claim is new and desire to secure by Letters Patent is:

1. In a fluorescent lamp assembly, a fixture for supporting several types of fluorescent lamps, means for supporting a germicidal lamp in the upper part of the fixture, a reflector mounted in the fixture for directing the rays of said germicidal lamp in a focal plane substantially 10° above the horizontal; a fluorescent illuminating lamp located in a plane beneath the germicidal lamp and a fluorescent sun lamp also mounted in the lower part of the fixture; reflector means spaced from said first mentioned reflector to form passageways for the heat from the last mentioned lamps around the germicidal lamp and also shielding the direct rays from the germicidal lamp except when viewed from substantially the same horizontal plane as the fixture; vertically extending baffles located under the illuminating lamp and the sun lamp to limit the direct rays from the said last mentioned lamps to a certain field, so that the direct rays from said last mentioned lamps cannot be perceived by an observer unless he is within the said certain field.

2. In a fluorescent lamp assembly, a fixture for supporting three types of fluorescent lamps mentioned below, the said fixture having end walls and also inner walls spaced from the respective ends; a germicidal lamp supported by said inner spaced walls; a reflector for directing the rays of said germicidal lamp in a focal plane substantially 10° above the horizontal; a fluorescent illuminating lamp located in a plane beneath the germicidal lamp and a fluorescent sun lamp also mounted in the lower part of the fixture; reflector means spaced from said first mentioned reflector to form passageways for the heat from the last mentioned lamps around the germicidal lamp and also shielding the direct rays from the germicidal lamp except when viewed from substantially the same horizontal plane as the fixture; and vertically extending spaced baffles located under the illuminating lamp and the sun lamp to limit the direct rays from the said last mentioned lamps to a certain field, so that the direct rays from said last mentioned lamps can not be perceived by an observer unless he is within the said certain field.

3. In a fluorescent lamp assembly, a fixture for supporting three types of fluorescent lamps mentioned below, said fixture including end-pieces and a bifurcated reflector located in the upper part of the fixture, and an arcuate reflector for directing the rays downwardly at the lower end of the bifurcated reflector; additional reflectors extending from the sides of the fixture inwardly and terminating at points spaced from the bifurcated reflector and above the arcuate reflector to form air passageways along the two arms of the bifurcated reflector; illuminating fluorescent lamps supported in the fixture beneath the said reflectors that extend from the sides of the fixture, and a fluorescent sun lamp located under the arcuate reflector; germicidal lamps mounted in the fixture opposite the arms of the bifurcated reflector, whereby the heat from the illuminating lamps and the sun lamp may pass upwardly and around said germicidal lamps; louvres in front of the germicidal lamps for directing the rays slightly above the horizontal; and vertically spaced baffles located beneath the illuminating lamps and the sun lamp to limit to a certain field the direct rays from said illuminating lamps and said sun lamp.

4. In a fluorescent lamp assembly, a fixture for supporting three types of fluorescent lamps mentioned below, said fixture including end-pieces, a bifurcated reflector located in the upper part of the fixture, an arcuate reflector at the lower end of the bifurcated reflector for directing the rays downwardly; additional reflectors extending from the sides of the fixture inwardly and terminating at points spaced from the bifurcated reflector and above the arcuate reflector to form air passageways along the two arms of the bifurcated reflector; illuminating fluorescent lamps supported in the fixture beneath the said reflectors that extend from the sides of the fixture; a fluorescent sun lamp located under the arcuate reflector; additional walls spaced inwardly from the said end-walls of the fixture, and germicidal lamps mounted in these inwardly spaced walls and opposite the reflecting arms of the bifurcated reflector, whereby the heat from the illuminating lamps and the sun lamp may pass upwardly and around said germicidal lamps; louvres in front of the germicidal lamps for directing the rays slightly above the horizontal; and vertically spaced baffles located beneath the illuminating lamps and the sun lamp to limit to a defined field the direct rays from said illuminating lamps and said sun lamp.

5. In a fluorescent lamp assembly, a fixture for supporting three types of fluorescent lamps mentioned below, said fixture including end-pieces and additional walls spaced inwardly from said end-walls of the fixture; a bifurcated reflector located in the upper part of the fixture and extending between these additional inwardly spaced walls; an arcuate reflector at the lower end of the bifurcated reflector and extending between the two first-mentioned end-pieces for directing the rays downwardly; additional reflectors also extending from the sides of the fixture inwardly and terminating at points spaced from the bifurcated reflector and located above the arcuate reflector and extending between the aforementioned end-pieces; the said additional reflectors forming air passageways along the two arms of the bifurcated reflector; illuminating fluorescent lamps supported in the fixture beneath the said reflectors that extend from the sides of the fixture; a fluorescent sun lamp located under the arcuate reflector; additional walls spaced inwardly from the said end-walls of the fixture; germicidal lamps mounted in these inwardly spaced walls and opposite the reflecting arms of the bifurcated reflector, whereby the heat from the illuminating lamps and the sun lamp may pass upwardly and around said germicidal lamps; louvres in front of the germicidal lamps for directing the rays slightly above the horizontal; and vertically spaced baffles located beneath the illuminating lamps and the sun lamp to limit to a defined field the direct rays from said illuminating lamps and said sun lamp.

ORLO A. BARTHOLOMEW.

References Cited in the file of this patent

UNITED STATES PATENTS

| Number | Name | Date |
|---|---|---|
| 2,339,010 | Greenwald | Jan. 11, 1944 |
| 2,341,885 | Beck | Feb. 15, 1944 |
| 2,348,617 | Furedy | May 9, 1944 |
| 2,447,498 | Ellner | Aug. 24, 1948 |
| 2,561,341 | Clark, Jr. | July 24, 1951 |